United States Patent [19]

Farrow

[11] 4,382,297

[45] May 3, 1983

[54] DEMULTIPLEX RECEIVER APPARATUS

[75] Inventor: Cecil W. Farrow, Highlands, N.J.

[73] Assignee: Bell Telephone Laboratories, Incorporated, Murray Hill, N.J.

[21] Appl. No.: 200,412

[22] Filed: Oct. 24, 1980

[51] Int. Cl.³ ............................................. H04J 3/06
[52] U.S. Cl. ................................... 370/112; 370/105
[58] Field of Search ................ 370/100, 105, 112, 11; 375/41, 42, 56

[56] References Cited

U.S. PATENT DOCUMENTS

| | | | |
|---|---|---|---|
| 3,128,343 | 4/1964 | Baker . | |
| 3,564,412 | 2/1971 | Whang et al. . | |
| 3,619,503 | 11/1971 | Ragsdale . | |
| 3,746,995 | 7/1973 | Schroeder et al. . | |
| 3,872,257 | 3/1975 | Bleickardt et al. | 370/112 |
| 3,943,285 | 3/1976 | Ragsdale et al. . | |
| 4,008,373 | 2/1977 | Nash et al. | 375/56 |
| 4,170,764 | 10/1979 | Salz et al. | 332/17 |

OTHER PUBLICATIONS

"Performance of Combined Amplitude and Phase-Modulated Communication Systems", IRE Transactions on Communications Systems, vol. CS-8, No. 4, pp. 232-237, Dec. 1960.

*Primary Examiner*—Gerald L. Brigance
*Attorney, Agent, or Firm*—Gregory C. Ranieri

[57] ABSTRACT

Accurate recovery of constituent data streams from a multiplexed serial data stream in which each symbol includes a nonintegral number of frames is accomplished by combining a coherently detected timing signal, which is a component of the received serial data stream, together with a bit clock signal and a symbol clock signal to locate a predetermined bit position within each frame. When the location of the predetermined bit position is determined, frame synchronization is complete and the constituent data streams are correctly demultiplexed from the multiplexed serial data stream. The timing signal has a pulse rate equal to the greatest common divisor of the frame and symbol rates.

7 Claims, 3 Drawing Figures

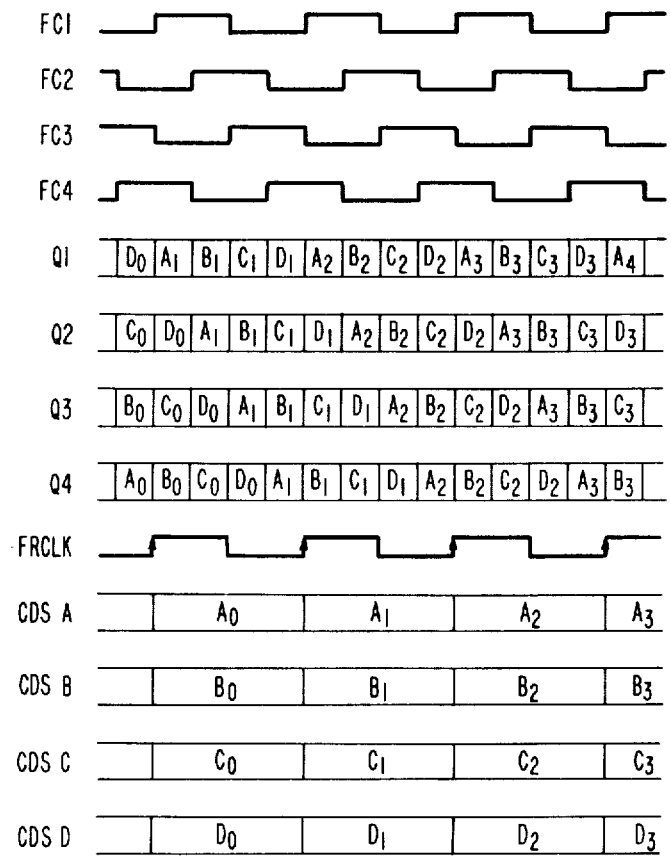

DEMULTIPLEX RECEIVER APPARATUS

CROSS-REFERENCE TO RELATED APPLICATIONS

U.S. patent application entitled "Multiplex Transmitter Apparatus", Ser. No. 200,414, inventor C. W. Farrow, is being filed in the U.S. Patent and Trademark Office concurrently herewith.

TECHNICAL FIELD

This invention relates to data transmission systems and, specifically, to a receiver for accurately demultiplexing constituent serial data streams from a multiplexed data stream.

BACKGROUND OF THE INVENTION

In data transmission systems, modems and multiplex equipment partition a serial data stream into two different sequences of bit groups: namely, symbols having M bits and frames having N bits. Typically, an integral number (M/N) of frames are grouped together to form a symbol.

A symbol clock signal synchronized with each symbol occurrence is also synchronized with each group of frames because of the integral relationship between symbols and frames. The symbol clock signal alone is necessary to recover each symbol in the modem and each frame in the multiplex equipment. Each similar transition of the symbol clock signal occurs at an identical position within each successive symbol. Hence, no ambiguity exists in using only the symbol clock signal to locate and define each frame because the symbol clock signal also coincides in phase once per symbol with an identical position of each successive integral number of frames comprising a symbol.

Known data transmission systems operate without ambiguity between the symbol clock and the frames only under the limited condition that each symbol includes an integral number of frames. A problem neither encompassed by the condition above nor addressed in the known prior systems occurs when a symbol includes a nonintegral number (M/N) of frames. In this situation, a so-called n-fold ambiguity arises with respect to the sequence of frames in the serial data stream because the beginning of a symbol and the beginning of a frame coincide only once every n symbols or n·M bits, where n equals N/GCD(N,M) and GCD(N,M) is the greatest common divisor of the two integers N and M. Consequently, the symbol clock signal traverses N complete cycles every M frames. That is, the symbol clock signal coincides in phase with identical positions in successive frames only once every n symbols, i.e., the n-fold ambiguity, as opposed to once every symbol in the prior systems.

Consequently, location and recovery of the frames and constituent data streams within consecutive frames is not possible in prior data transmission systems when a symbol includes a nonintegral number of frames because of the existing n-fold ambiguity between the symbol clock and the frame locations.

SUMMARY OF THE INVENTION

Resolution of an n-fold ambiguity between the symbol clock and the frame locations resulting in accurate recovery of constituent data streams from a multiplexed serial data stream in which each symbol includes a nonintegral number of frames is realized, in accordance with an aspect of the invention, by synchronously detecting a timing signal, which is a component of the received multiplexed serial data stream, for controlling the phase of a frame clock signal with respect to the location of a predetermined bit position within each frame. When the frame clock signal is synchronized with the location of the predetermined bit position, the constituent data streams are correctly demultiplexed from the serial data stream.

In one embodiment of the invention, a received signal is an amplitude modulated (AM)/differentially phase shift keyed (DPSK) serial data stream wherein the timing signal is a low level amplitude modulation component of the received signal applied at a transmit modem after the DPSK modulation. The modem establishes the symbol length, M bits, and generates a symbol clock signal at a prescribed symbol clock pulse rate. In response to the received signal, a receive modem recovers the symbol clock signal and the serial data stream as well as a bit clock signal synchronized with the occurrence of each bit in the serial data stream. The timing signal is recovered from the received signal by amplitude or envelope demodulation. Phase demodulation of the recovered timing signal with respect to a local timing signal in prescribed relationship to the symbol clock signal is subsequently performed to generate control signals for synchronizing the phase of the frame clock signal with each frame in the serial data stream. Phase control of the frame clock signal through phase demodulation of the recovered timing signal allows the demultiplex receiver arrangement to resolve the n-fold ambiguity arising with respect to the location of a particular position within each frame and to accurately demultiplex the constituent data streams from the serial data stream.

In accordance with another aspect of the invention, the timing signal pulse rate is the greatest common divisor of the frame and symbol clock rates which are nonintegrally related.

BRIEF DESCRIPTION OF THE DRAWING

A more complete understanding of the invention may be obtained by reading the following description of a specific illustrative embodiment in conjunction with the appended drawing in which:

FIGS. 2 and 3 are timing diagrams showing representations of signals denoted in FIG. 1.

GENERAL DESCRIPTION (FIG. 1)

Received signal RS supplied to the receiver via terminal 101 is demodulated by modem 102 and a timing signal recovery circuit to extract, in this example, symbol clock signal SC, bit clock signal BC, timing signal TS and serial data stream SDS. Signal TS is combined with signals BC and SC in phase demodulator 110 and phase selector circuit 121 to control, in accordance with an aspect of the invention, the phase of frame clock signal FRCLK. When signal FRCLK is synchronized in phase with each frame in data signal SDS, the serial to parallel converter circuit accurately recovers constituent data streams CDSA, CDSB, CDSC and CDSD from signal SDS.

Figure 2:
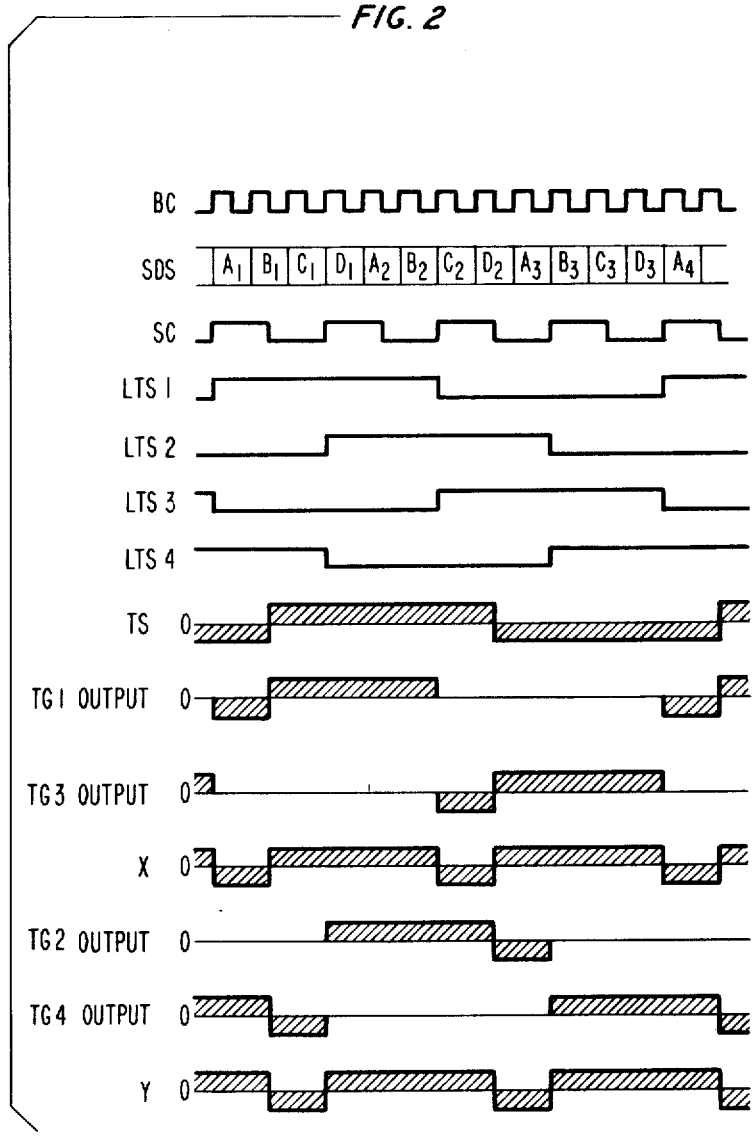

SIGNAL DESCRIPTION (FIGS. 2 and 3)

Figure 1:
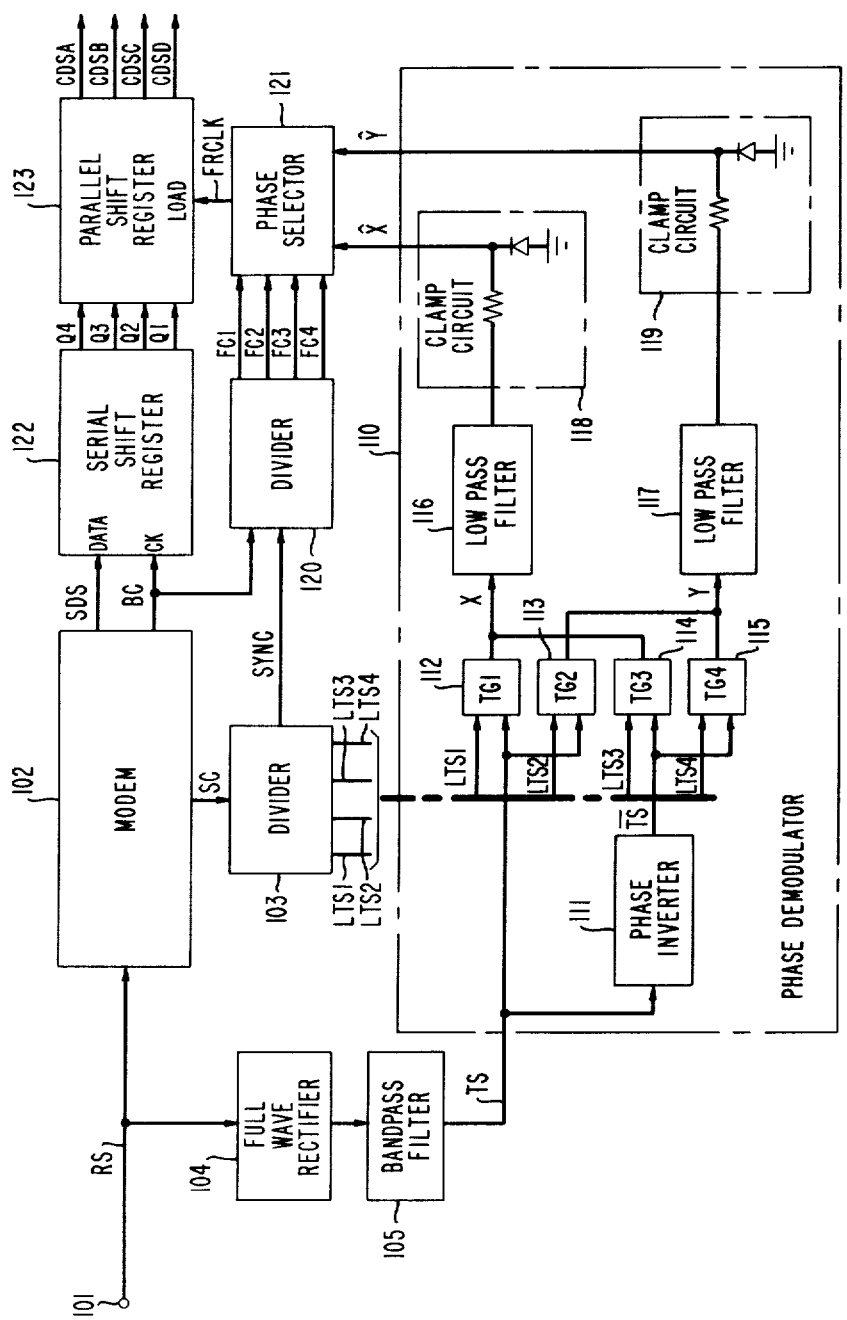
FIG. 1 is a simplified block diagram of the demultiplex receiver arrangement embodying an aspect of the invention.

FIGS. 2 and 3 illustrate an exemplary set of output signals from the demultiplex receiver arrangement shown in FIG. 1. Received signal RS supplied to the receiver arrangement causes the illustrative output signals to be generated.

Certain characteristics of signal RS which are important to the operation of the arrangement in FIG. 1 are described below. These and other characteristics of received signal RS and the apparatus for generating signal RS are described in my copending application Ser. No. 200,414 noted above. Signal RS comprises two components, namely, an amplitude modulation (AM) component causing signal RS to have less than a 5 percent modulation index and an angle modulation component obtained by differential phase shift keying (DPSK) modulation. The DPSK modulation component of signal RS depends upon the data bits in data signal SDS and corresponding clock signals. On the other hand, the AM modulation component represents timing signal TS and is a function of the frame (FRCLK) and symbol (SC) clock signals, totally independent from the data bits in signal SDS. Signals SDS, BC and SC are recovered by DPSK demodulation of signal RS; signal TS is recovered by AM demodulation of signal RS.

Serial data stream signal SDS is a multiplexed serial bit stream comprised of two different groups of bits: namely, frames having N bits and symbols having M bits. Both N and M are integers and M/N is a nonintegral rational number. In terms of serial data stream signal SDS, this means that each symbol in signal SDS includes a nonintegral number (M/N) of frames.

The symbol length, M bits, is determined by the DPSK modulation selected for use in modem 102. Eight-phase DPSK modulation, as utilized in this example, requires that each symbol in signal SDS include three bits ($M=3$) to uniquely represent each phase of the eight-phase ($2^3=8$) DPSK modulation.

The frame length, N bits, is established by the multiplex equipment. Typically, a frame includes one bit from each constituent data stream so that, for N constituent data streams, each frame of serial data stream signal SDS includes N bits, i.e., one bit from each of the N constituent data streams. In this example, there are four constituent data streams multiplexed into serial data stream signal SDS. Consequently, each frame has a length of four bits ($N=4$). It should be noted that the value of N used throughout the example is equal to the value of n because N and M are relatively prime and have a greatest common divisor of 1.

In referring to signal SDS, it is important to understand the following notation. Numerically subscripted letters represent individual bits of serial data stream signal SDS. Each letter corresponds to a single bit multiplexed from a constituent data stream. For example, bits $A_1$, $A_2$, $A_3$ and so on are consecutive bits from the constituent data stream which forms signal CDSA. Numeric subscripts, 1 through 4, indicate the particular frame in signal SDS to which a subscripted letter (bit) is associated. That is, all letters having the same subscript belong to the same frame.

In the example from experimental practice depicted by the signals in FIG. 2, each symbol includes three bits ($M=3$) and each frame includes four bits ($N=4$). Assuming that bit $A_1$ of signal SDS is the first bit of both a symbol and a frame, the following sequences of symbols and frames result: the symbol sequence is $$A_1B_1C_1-D_1A_2B_2-C_2D_2A_3-B_3C_3D_3-A_4\ldots,$$

and the corresponding frame sequence is $$A_1B_1C_1D_1-A_2B_2C_2D_2-A_3B_3C_3D_3-A_4\ldots$$

Coincidence of the starting bit position of a symbol and the starting bit position of a frame occurs only once every four symbols ($n=4$) or twelve bits ($n \cdot M=12$). A four-fold ambiguity ($n=4$) exists when using the symbol clock signal SC synchronized to a particular bit position in each symbol for locating a starting bit position for each frame. This ambiguity is discussed in more detail below with respect to signal SC.

Clearly, for the symbol sequence shown above, each symbol includes a nonintegral number ($\frac{3}{4}$) of frames. Additionally, the frame rate, X/N frames per second, is equal to the product of a nonintegral rational number ($\frac{4}{3}$) and the symbol rate, X/M symbols per second, where X bits per second (bps) is the bit rate of serial data stream signal SDS. It is noted that the bit rate is integrally divisible by the frame rate and by the symbol rate. A bit rate for each constituent data stream is X/N bps. In this example, the bit rate is 4800 bps ($X=4800$) causing the symbol rate to be 1600 symbol per second, the frame rate to be 1200 frames per second and the bit rate of each constituent data stream to be 1200 bps.

Bit clock signal BC has a pulse rate of X pulses per second (pps), i.e., one positive pulse transition at each bit occurrence in serial data stream signal SDS. Each positive transition of signal BC is synchronized with a starting position of each bit in signal SDS. In this example, the bit clock pulse rate is 4800 pps. ($X=4800$).

Signal BC defines the location of each bit position in serial data stream signal SDS. Moreover, bit clock signal BC defines each bit position in every frame or symbol. However, bit clock signal BC is incapable of distinguishing between any N or n, in this example, consecutive bits as the starting bit of a frame. Therefore, signal BC lacks the capability for recovering each constituent data stream from the consecutive frames of signal SDS.

Symbol clock signal SC has a pulse rate of X/M pps which, in this example, is 1600 pps. Each positive transition of signal SC is aligned with the beginning of a symbol, namely, bit positions $A_1$, $D_1$, $C_2$, and $B_3$ in serial data stream signal SDS. At the end of four consecutive symbols ($n=4$) or twelve bits ($n \cdot M=12$), symbol clock signal SC repeats the pattern of positive transitions at bit locations $A_4, D_4, C_5$ and $B_6$ (not shown) over the next four consecutive symbols in the serial data stream. Only once every n·M bits or n symbols does symbol clock signal SC correctly indicate the starting bit position of a frame, i.e., bit positions $A_1$ and $A_4$ in serial data stream signal SDS. Thus, a rate of coincidence between positive transitions of symbol clock signal SC and the starting bit position of a group of frames in signal SDS is X/(n·M) which, in this example, is 400 pps.

Although, symbol clock signal SC correctly identifies the starting bit position ($A_1$) for one out of three consecutive frames, the symbol clock signal incorrectly identifies three other possible starting bit positions ($D_1$, $C_2$ or $B_3$) within the same group of consecutive frames. Since signal SC cannot clearly distinguish which of the four bit positions ($A_1$, $D_1$, $C_2$ or $B_3$) at positive transitions of signal SC is the starting bit position of a frame, a four-fold ambiguity ($n=4$) results in locating the beginning of a frame using symbol clock signal SC alone. Thus, symbol clock signal SC is incapable of accurately locating each frame of serial data stream signal SDS and, in turn, recovering each constituent data stream from the consecutive frames of serial data stream signal SDS.

Timing signal TS has a pulse rate of $X/(n \cdot M)$ pps which in this example, is 400 pps and related to the pulse rates of the frame and symbol clock signals. The timing signal pulse rate is a common divisor and, specifically, the greatest common divisor of the frame and symbol clock pulse rates. When the timing signal pulse rate is equal to the greatest common divisor of the frame (FRCLK) and symbol (SC) clock signal pulse rates, timing signal TS spans a minimum number of frames per cycle and thereby allows for synchronization of frame clock signal FRCLK in less time than for a timing signal pulse rate at a different common divisor of the frame and symbol clock rates. It is by the judicious combination of timing signal TS together with symbol clock signal SC described in more detail below that the n-fold ambiguity (n=4) is resolved between symbol clock SC and the starting bit position for frames in serial data stream SDS.

As a result of the n-fold ambiguity being resolved, frame clock signal FRCLK is controlled in phase to have positive transitions synchronized with the starting bit position of each frame in signal SDS, in this example, bit position $A_1$, $A_2$, $A_3$. Frame clock signal FRCLK and polyphase frame clock signals FC1, FC2, FC3 and FC4 have pulse rates equal to $X/N$ pps which, in this example, is 1200 pps.

Each polyphase frame clock signal is synchronized with a particular bit position in each consecutive frame. For example, each positive transition of signal FC1 (FIG. 3) is aligned with the first bit position of each frame, i.e., $A_1$, $A_2$, $A_3$, of serial data stream signal SDS in FIG. 2. Similarly, signal FC2 has positive transitions aligned with the second bit position of each frame, i.e., $B_1$, $B_2$, $B_3$, of signal SDS. The polyphase frame clock signals are generated from bit clock signal BC according to the following relationships: $FC3 = \overline{FC1}$, and both FC1 and FC2 differ by 90 degrees.

DETAILED DESCRIPTION

The demultiplex receiver arrangement shown in FIG. 1 comprises modem 102, a timing signal recovery circuit including full wave rectifier 104 and bandpass filter 105, phase demodulator 110, phase selector circuit 121, a serial to parallel converter circuit including serial shift register 122 and parallel shift register 123, and other associated circuits. Demodulation and demultiplexing are the major functions performed by the demultiplex receiver arrangement in FIG. 1.

Modem 102 is a DPSK modem of the type well known in the art. See, for example, U.S. Pat. No. 3,746,995 issued to H. Schroeder et al. on July 17, 1973 and U.S. Pat. No. 3,128,343 issued to P. A. Baker on Apr. 7, 1964. Modem 102 responds to an eight-phase DPSK signal, received signal RS, to recover serial data stream signal SDS as well as to generate bit clock signal BC and symbol clock signal SC synchronized to data stream signal SDS.

Symbol clock signal SC is supplied to divider 103. Divider 103 is a divide-by-four circuit. The divisor, four, is equal to the degree of ambiguity present between signal SC and the frames in serial data stream signal SDS. Divider 103 responds to symbol clock signal SC to generate local timing signals LTS1, LTS2, LTS3 and LTS4. Each local timing signal has a distinct phase which is spaced apart from the phases of the other local timing signals. Local timing signals LTS1, LTS2, LTS3 and LTS4 are output from divider 103 at appropriate phases so that $LTS3 = \overline{LTS1}$, $LTS4 = \overline{LTS2}$, and LTS1 differs from LTS2 by 90 degrees. The pulse rate of each local timing signal is substantially equal to the pulse rate of timing signal TS, i.e., 400 pps.

In one cycle local timing signals LTS1 through LTS4 extend over four symbols and three frames. Each local timing signal has a positive transition which is aligned with a particular bit position in each third frame. For instance, signal LTS1 has positive transitions aligned with a first bit position in the first and fourth frames, namely, $A_1$ and $A_4$. Similarly, signal LTS4 has positive transitions aligned with a second bit position in the third and sixth (not shown) frames, namely, $B_3$ and $B_6$ (not shown). Local timing signals LTS1 through LTS4 are combined with timing signal TS in phase demodulator 110 to clarify the four-fold ambiguity which exists with respect to locating the starting bit for each frame in serial data stream signal SDS.

Synchronizing signal SYNC (FIG. 1) is a pulse signal also generated by divider 103. Signal SYNC is supplied to divider 120 as a periodic initialization pulse to ensure that each polyphase frame clock signal FC1 through FC4 generated by divider 120 has a predetermined phase relationship with symbol clock signal SC and particular ones of local timing signals LTS1 through LTS4. The phase relationship of these signals affects the values of signals $\hat{X}$ and $\hat{Y}$ for each particular phase of timing signal TS. An example of this phase relationship is shown in FIG. 2. Signal SYNC, in this example, is generated in accordance with the following logical equation:

SYNC = LTS1 + LTS4 + SC, where + is understood to be a logical OR function.

The timing signal recovery circuit includes full wave rectifier 104 and bandpass filter 105. Full wave rectifier 104 and bandpass filter 105 are utilized to recover timing signal TS from received signal RS by amplitude demodulating signal RS. Amplitude demodulation is performed by a narrowband envelope detection of signal RS about the frequency or pulse rate of signal TS, i.e., 400 Hz or 400 pps.

Full wave rectifier 104 maintains the phase relationship of timing signal TS with respect to serial data stream signal SDS and symbol clock signal SC as received by modem 102. In order to accomplish this in the example from experimental practice, a full wave rectifier within modem 102 is employed as rectifier 104 to avoid advancing or retarding the phase of timing signal TS.

Bandpass filter 105 has a center frequency at 400 Hz and exhibits a substantially flat amplitude response characteristic with a low quality factor, approximately unity, to avoid introducing any phase shift into signal TS. In experimental practice, filter 105 comprises a low pass filter having a cutoff frequency above 400 Hz combined with a high pass filter having a cutoff frequency below 400 Hz.

Phase demodulator 110 coherently detects the phase differences between the received (TS) an locally generated (LTS1 through LTS4) timing signals to indicate and control the phase of the frame clock signal which properly synchronizes signal FRCLK with the frames in serial data stream signal SDS. Control signals $\hat{X}$ and Ŷ generated by phase demodulator 110 are employed to control the phase of frame clock signal FRCLK.

Phase demodulator 110 comprises a phase detection circuit and a waveshaping circuit. The phase detection circuit includes phase inverter 111 and transmission gates 112, 113, 114 and 115; the waveshaping circuit includes low pass filters 116 and 117 and clamp circuits 118 and 119.

The following description of phase demodulator 110 is focused on those phase detection and waveshaping circuit elements which generate signals X and X̂ at the output of phase demodulator 110. When appropriate changes are made to the signal names and element reference numerals, the following description also applies to the phase detection and waveshaping circuit elements in phase demodulator 110 which generate signals Y and Ŷ.

The phase detection circuit generates bipolar signals X and Y according to the following logical relationships:

$$X = TS \cdot LTS1 + \overline{TS} \cdot LTS3,$$

$$Y = TS \cdot LTS2 + \overline{TS} \cdot LTS4,$$

where · is a logical AND function and + is a logical OR function.

In the phase detection circuit, transmission gate 112 causes signal TS to be multiplied by local timing signal LTS1 in order to detect a phase difference between signals LTS1 and TS. Multiplication, as performed by each transmission gate, is functionally equivalent to a logical AND function and is so indicated in the logical relationships above. When signal LTS1 in FIG. 2 is a logical '0,' transmission gate 112 is inhibited from transmitting timing signal TS. This is evidenced by signal TG1 OUTPUT from transmission gate 112 being at a bipolar zero level. Otherwise, when signal LTS1 is a logical '1,' gate 112 transmits the positive and negative levels of timing signal TS as signal TG1 OUTPUT.

Phase inverter 111 shifts the phase of timing signal TS by 180 degrees to generate bipolar inverted timing signal $\overline{TS}$ which is supplied to transmission gate 114. Local timing signal LTS3 is supplied to an input of transmission gate 114 and multiplies signal $\overline{TS}$. Gate 114 is controlled by signal LTS3 to inhibit or transmit signal $\overline{TS}$, thereby generating signal TG3 OUTPUT.

The output signals from transmission gates 112 and 114 are wired OR to generate signal X. This is equivalent to algebraically summing signal TG1 OUTPUT with signal TG3 OUTPUT to generate signal X.

In the waveshaping circuit of phase demodulator 110, signal X is slowly integrated by low pass filter 116 (FIG. 1) to smooth and substantially eliminate rapid positive and negative transitions of that signal. Clamp circuit 118 limits any negative excursions in the output signal of filter 116 to a logical '0' level. Signal X̂ output from clamp circuit 118 is effectively a binary signal. Since the input signal (signal X) to the waveshaping circuit is bipolar and the output signal (signal X̂), is binary, the combination of low pass filter 116 and clamp circuit 118 performs a bipolar to binary level conversion of input signal X.

In this example, filter 116 has a time constant of 0.1 sec. With such a long time constant, low pass filter 116 smoothes the positive and negative transitions signal X shown in FIG. 2 and generates a substantially positive valued signal. Any negative levels of the output signal from filter 116 are limited to be a logical '0' level by clamp circuit 118 and signal X̂ in this example is a logical '1.'

As stated earlier, a similar analysis applies to transmission gates 113 and 115, phase inverter 111, low pass filter 117 and clamp circuit 119 in the generation of signal Ŷ. In this example, for the particular timing signal TS and locally generated timing signals LTS2 and LTS4, transmission gate 113 generates signal TG2 OUTPUT and transmission gate 115 generates signal TG4 OUTPUT. Signals TG2 OUTPUT and TG4 OUTPUT are wired OR together to generate signal Y, which is a substantially positive valued signal in this example. Control signal Ŷ from clamp circuit 119 is a logical '1.'

Divider 120 generates four polyphase frame clock signals FC1, FC2, FC3, and FC4 at the frame clock signal pulse rate in response to bit clock signal BC. Each polyphase frame clock signal has positive transitions synchronized with a particular bit position in each frame.

The divisor utilized in divider 120 is equal to n, the frame length divided by the greatest common divisor of the frame length and the symbol length. Since n is equal to four in this example, divider 120 is a divide-by-four circuit. Therefore, the pulse rate of each polyphase frame clock signal is 1200 pps, which is the frame clock pulse rate as stated above.

As mentioned above, divider 120 also responds to signal SYNC to generate signal FC1 in a predetermined phase relationship with signals SC and LTS1 shown in FIGS. 2 and 3. This in turn results in similar predetermined phase relationships between signals FC2, LTS2 and SC, signals FC3, LTS3 and SC and signals FC4, LTS4 and SC. These relationships affect the operation of phase selector 121 and, more particularly, are necessary for establishing the response to phase selector 121 to control signals X̂ and Ŷ as described below.

Phase selector 121 responds to the levels of control signals X̂ and Ŷ from phase demodulator 110 for controlling the phase of frame clock signal FRCLK to ensure accurate recovery of constituent data streams CDSA through CDSD. In the embodiment shown in FIG. 1, phase selector 121 selects one of the polyphase frame clock signals FC1, FC2, FC3 or FC4 to be output as frame clock signal FRCLK which has a positive transition synchronized with a predetermined bit position in each frame of serial data stream signal SDS.

A set of responses by selector 121 to all possible combinations of levels for control signals X̂ and Ŷ is determined a priori according to the phase relationship between timing signal TS and symbol clock signal SC over four consecutive symbols (n=4) of signal SDS. The phase relationship of signals TS and SC to signal SDS is determined at a multiplex transmitter arrangement in the data transmission system such as is described in my copending application, Ser. No. 200,414. An exemplary set of responses by phase selector 121 to signals X̂ and Ŷ is given below. When control signals X̂ and Ŷ are both at a high level (logical '1'), signal FC1 is output as signal FRCLK. A change in signal Ŷ to a low level causes signal FC2 to be selected. For control signals X̂ and Ŷ both at low levels, phase selector 121 outputs signal FC3 as signal FRCLK. Signal FC4 is selected when signal X̂ is low and signal Ŷ is high.

Phase selector 121 in combination with phase demodulator 110 control the phase of frame clock signal FRCLK by selecting phase adjustments therefor to provide proper synchronization of frame clock signal FRCLK to serial data stream signal SDS. Signal FRCLK is synchronized to a predetermined bit position within each frame. In this example, positive transitions of signal FRCLK are aligned with the first bit position of each frame ($A_1$, $A_2$, $A_3$, etc.). After signal FRCLK is properly synchronized with each frame, the frame clock signal can be employed by the serial to parallel converter circuit to accurately recover the constituent data streams from each frame in signal SDS.

The serial to parallel converter circuit comprising serial shift register 122 and parallel shift register 123 translates serial data stream signal SDS into parallel streams of bits on a frame-by-frame basis. The separate parallel streams of bits form constituent data streams CDSA through CDSD. Conversion of serial data stream SDS into properly ordered parallel constituent data streams is the final step in the demodulation and demultiplexing of received signal RS.

Serial shift register 122 responds to bit clock signal BC (CK input) for serially shifting consecutive bits of signal SDS (DATA input) into and through the stages of register 122. The number of stages in shift register 122, four (N=4) in this example, corresponds to the number of bit positions in each frame in signal SDS. Output signals from successive stages of shift register 122 are represented as signals Q1, Q2, Q3 and Q4. Signal Q1 is the first stage output from shift register 122; signals Q2, Q3 and Q4 are the second, third and fourth stage outputs, respectively.

Parallel shift register 123 accepts each output signal from register 122 and stores each in a separate stage of register 123 at each positive transition of frame clock signal FRCLK supplied via the LOAD input of register 123. In other words, the contents of register 122 are transferred in parallel from register 122 to register 123 upon a positive transition of signal FRCLK with storage occurring in register 123. Register 123 has at least the same length as register 122. Once stored, the contents of register 123 immediately appear at the outputs of register 123 in parallel as constituent data streams CDSA, CDSB, CDSC and CDSD.

As shown in FIG. 3, the representations of output signals Q1 through Q4 from shift register 122 show the contents of shift register 122 changing at successive positive transitions of bit clock signal BC. For instance, the contents of shift register 122 at a first positive transition of signal BC transition are $D_0C_0B_0A_0$, wherein $D_0$ is stored in the first stage of register 122, $C_0$ in the second stage and so on for $B_0$ and $A_0$. The next positive transition of bit clock signal BC causes the stored sequence to shift one bit position causing a new sequence $A_1D_0C_0B_0$ to be stored.

The contents of register 122 are transferred to register 123 at each positive transition of signal FRCLK denoted by arrows. As soon as the data bits are stored in register 123, the contents of register 123 are output as signals CDSA through CDSD. On the first positive transition of signal FRCLK, $A_0$ from signal Q4 is stored in register 123 and output in signal CDSA. Similarly, $B_0$ from signal Q3 is stored in register 123 and output in signal CDSB and so on for $C_0$ and $D_0$ stored in register 123. The output signals from register 123 change at a next positive transition of signal FRCLK. At this point, the constituent data streams have been accurately recovered from the multiplexed serial data stream.

It is understood by those skilled in the art that, although element 102 has been described as a modem, it is equivalently characterized as a data set or similar without departing from the spirit and scope of this invention.

I claim:

1. Receiver apparatus of the type including means (102) responsive to an input signal (RS) for generating a corresponding serial bit stream (SDS) having a plurality of bits arranged in consecutive symbols and also for generating a symbol clock signal (SC) having a first pulse rate related to a rate of occurrence for each symbol and a bit clock signal (BC) having a second pulse rate related to a rate of occurrence for each bit in the corresponding serial bit stream, the serial bit stream also capable of being partitioned into consecutive frames, the receiver apparatus characterized by, means (120) responsive to the bit clock signal for generating at least one frame clock signal (e.g., FC1, FC2, FC3, FC4) having a third pulse rate related to a rate of occurrence of consecutive frame, in the corresponding serial bit stream, wherein M/N is a nonintegral rational number, means (104, 105) responsive to the input signal for generating a timing signal (TS) having a pulse rate related in a prescribed manner to the first and third pulse rates, and means (103, 110, 121) jointly responsive to the symbol clock signal and the timing signal for controlling the at least one frame clock signal to have a phase synchronized with a predetermined bit position ($A_0$, $A_1$, $A_2$, $A_3$) of each frame, so that a predetermined transition of the frame clock signal occurs at the predetermined bit position of each frame in the corresponding serial bit stream.

2. The apparatus as defined in claim 1 further characterized by, means (122, 123) jointly responsive to the bit clock signal and the frame clock signal synchronized in phase with the predetermined bit position of each frame for converting the corresponding serial bit stream into not more than N constituent serial bit streams (CDSA, CDSB, CDSC, CDSD).

3. The apparatus as defined in claim 2 wherein the pulse rate of the timing signal is a common divisor of the first and third pulse rates.

4. The apparatus as defined in claim 3 wherein the timing signal generating means includes an envelope detector for amplitude demodulating the input signal to recover the timing signal therefrom.

5. The apparatus as defined in claim 3 wherein the common divisor is the greatest common divisor of the first and third pulse rates.

6. The apparatus as defined in claim 5 wherein the at least one frame clock signal generating means generates a plurality of frame clock signals, each frame clock signal having a predetermined phase and the third pulse rate, and the means for controlling includes, means responsive to the symbol clock signal and the timing signal for selecting one frame clock signal of the plurality of frame clock signals having a predetermined transition occurring at the predetermined bit position of each frame.

7. The apparatus as defined in claim 6 wherein the means for selecting includes, means (103, 110) responsive to the symbol clock signal and the timing signal for generating at least one control signal (X, Y) employed to select the one frame clock signal from the plurality of frame clock signals which identifies the predetermined bit position of each frame in the corresponding serial bit stream, and means (121) jointly responsive to the at least one control signal for selecting the one frame clock signal from the plurality of frame clock signals.

* * * * *